Nov. 30, 1965   E. D. HEWES ETAL   3,220,275
DOCUMENT DRIVE TRANSMISSION

Filed Aug. 1, 1963   2 Sheets-Sheet 1

INVENTORS
ELLSWORTH D. HEWES
RALPH R. TILLY
JACK O. WILSON

BY

ATTORNEY

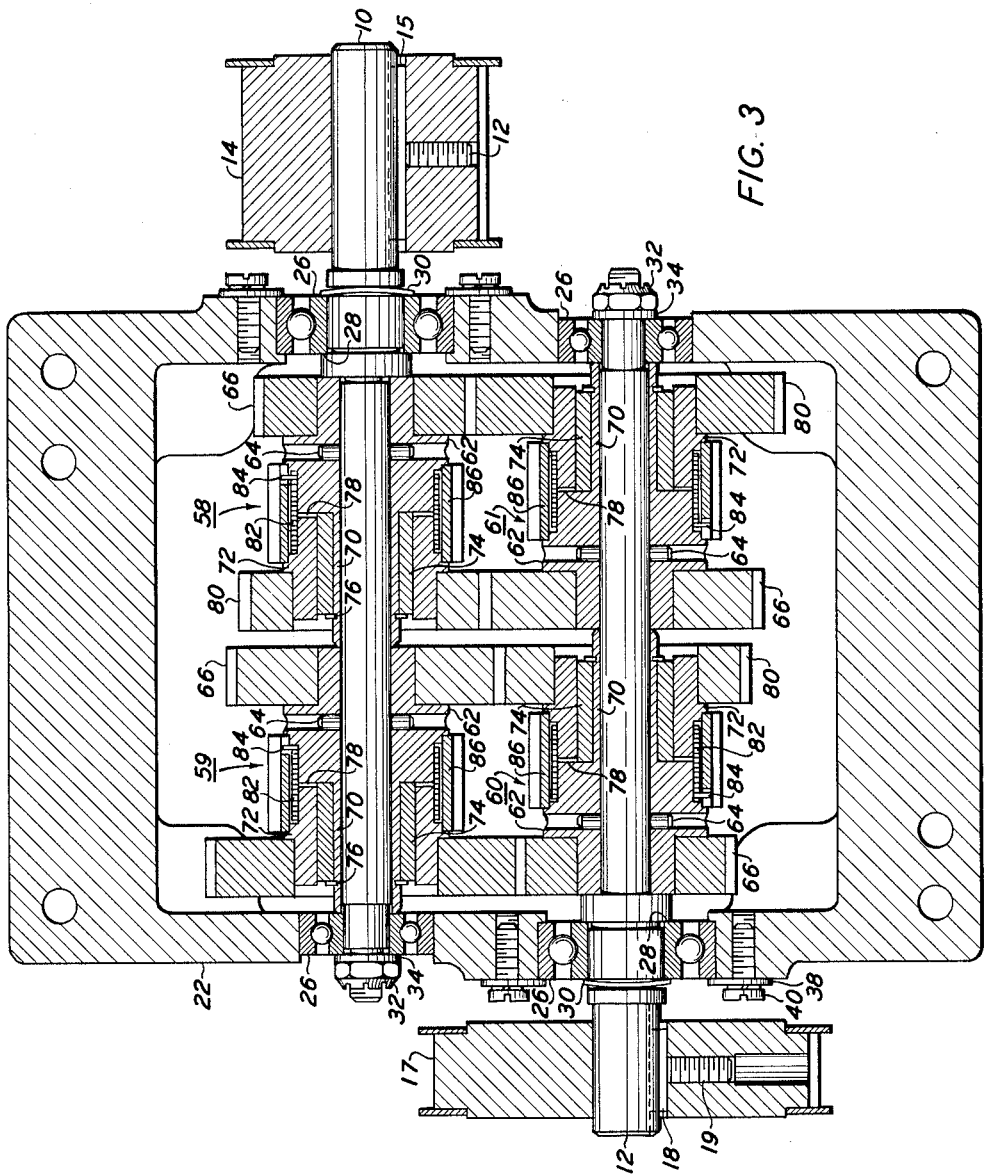

United States Patent Office 3,220,275
Patented Nov. 30, 1965

3,220,275
DOCUMENT DRIVE TRANSMISSION
Ellsworth D. Hewes, Rochester, Ralph R. Tilly, Ontario, and Jack O. Wilson, Rochester, N.Y., assignors to Xerox Corporation, Rochester, N.Y., a corporation of New York
Filed Aug. 1, 1963, Ser. No. 299,416
3 Claims. (Cl. 74—368)

This invention relates to variable speed transmissions of the type wherein a predetermined number of output speeds may be selected from a constant speed input.

There are numerous situations wherein a selected, accurately controlled, and intermittently operable output speed is required from a constant speed input. For example, copying or reproducing apparatus requires constant speed of a document conveyor, and for purposes of enlargement or reduction, requires a number of constant speeds selectable by the operator. The present invention incorporates a simple clutch and gear arrangement which is economical to construct and is immediately responsive to the operator's selection of a particular output speed.

It is the primary object of this invention to improve power transmissions so that an operator may select a variety of output speeds without varying the input speed to the transmission.

It is a further object of this invention to improve power transmissions so that a number of output speeds may be obtained from a pair of parallel shafts.

It is also an object of this invention to improve power transmissions so that a number of output speeds may be obtained from two parallel shafts and constantly meshed gears.

It is also an object of this invention to improve power transmissions so that they are economical to construct and simple in operation.

These and other objects of the invention are attained by means of a transmission constructed of a series of clutch and gear arrangements on two parallel shafts which are solenoid actuated to provide a torque transmitting relationship between the two shafts.

For a better understanding of the invention, as well as other objects and further features thereof, reference is had to the following detailed description of the invention to be read in connection with the accompanying drawings, wherein.

Figure 1:
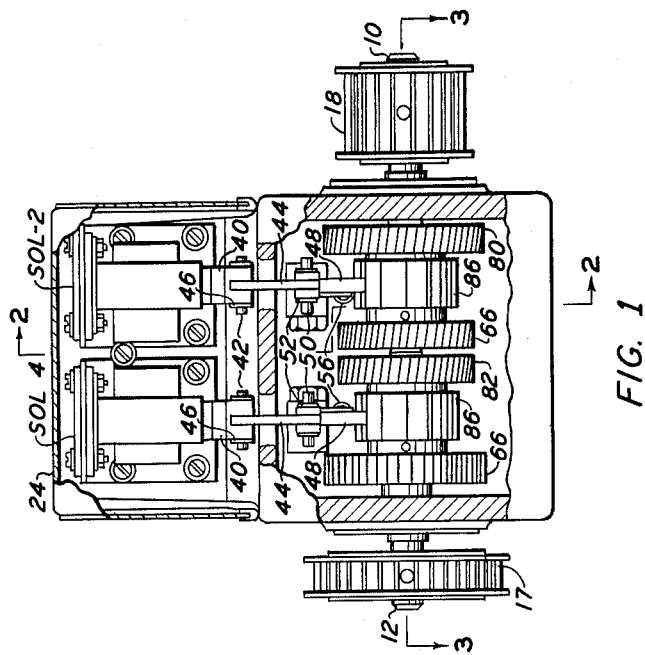
FIG. 1 is a front view of an illustrative embodiment of the present transmission mechanism with the external covers broken away to show the interior construction of the transmission.
Figure 2:
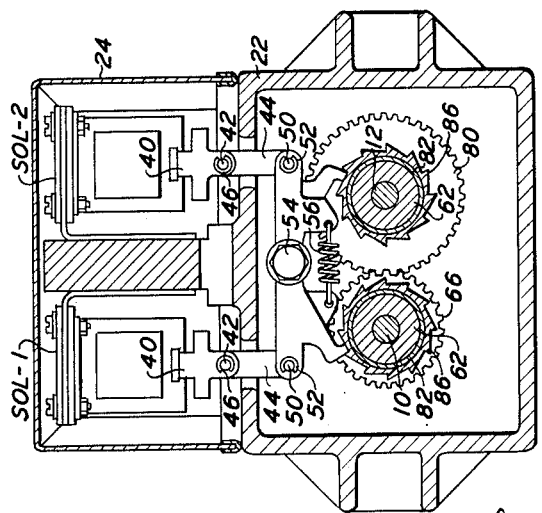
FIG. 2 is a cross sectional view of the present invention taken along line 2—2 of FIG. 1; and, FIG. 3 is a plan view of the transmission taken along line 3—3 of FIG. 1.

In the illustrative embodiment of the present invention shown in FIGS. 1 through 3, a power input shaft 10 and a power output shaft 12 are arranged in parallel to receive and to transmit power, respectively. A pulley 14 is secured on the input shaft 10 to transmit power thereto by means of a key 15 and is held axially on the shaft by means of a set screw 16. A second pulley 17 is secured to the output shaft by means of a key 10 and is held axially thereon by means of set screw 19.

The input shaft 10 and the output shaft 12 are journaled in the side walls of the transmission housing 22 by means of ball bearings 26. The shafts are held in a lateral direction by means of shoulders 28 and thrust washers 30 on the pulley ends of the shafts and by castle nuts 32 and washers 34 on the opposite or threaded end of the shafts. The ball bearings 26 on the pulley ends of the shafts are held in housing 22 by means of shoulders 36 and retaining plates 38. The retaining plates 38 are removably secured to the housing by means of screws 40.

The transmission controls are mounted on the top of the housing 22 within a cover 24. The controls consist of four solenoids SOL-1, SOL-2, SOL-3 and SOL-4, three of which can be seen in FIGS. 1 and 2. The solenoids are independently activated through a control circuit, not shown, attached to a suitable power supply. Each solenoid has a plunger 40 extending downward toward the transmission housing and terminating at pins 42. The plungers are bifurcated at the pin end to receive a connecting arm 44. The connecting arm 44 is pivotally secured to the plunger 40 by the pin 42 which is held in place by snap rings 46. The arm 44 extends through openings in the top of the housing 22 and is pivotally connected to pawls 48 within the transmission housing. The pawls 48 are bifurcated at one end to receive the connecting arm 44 which is secured thereto by pin 50 and snap rings 52, in the same manner as the plunger is connected to the arm 44. The pawls are pivotally attached on a shaft 54 and are biased in a downward direction by a spring 56 for engagement with a seires of ratchet teeth to be described below. Actuation of the solenoid draws the plunger 40 in an upward direction, moving the pawl 48 against the action of the springs 56 and disengaging the pawl from the ratchet members. Deactivation of the solenoids releases the plunger 40 and the spring 56 draws the pawl downward about shaft 54 so that the pawl again engages the ratchet member.

The interior of the transmission housing consists of a series of clutch and gear arrangements adapted to provide power transmission from the input shaft 10 through a predetermined gear reduction ratio to the output shaft 12. There are four clutch and gear arrangements, two on the input shaft and two on the output shaft, generally indicated as 58 and 59 on shaft 10, and 60 and 61 on shaft 12. The clutch and gear arrangements are identical in operation and structure except for their relative position and location on the shafts and the size of gears used. The particular clutches disclosed herein are manufactured by Curtiss-Wright Corporation under the designation of Series C Clutches. Each clutch consists of a shaft adapter 62 secured for rotation to either the input or the output shaft by a pin 64 passing through the adapter and through the shaft. A gear 66, appropriately sized for the speed reduction desired, is secured to the adapter 62 for rotation therewith. The adapter 62 and the gear 66 continuously rotate with the movement of the shafts with which it is associated.

The adapter 62 has a pair of undercut diameters 68 and 70 extending along the shaft. A mounting hub 72 encircles the smaller diameter 70 of the adapter 62 and is separated therefrom by a bearing 74. The bearing 74 is held on the adapter 62 by means of a retaining ring 76 and abuts the shoulder 78 between the two diameters 68 and 70. A floating gear 80 is secured to the mounting hub 72 for rotation therewith and is sized according to the particular speed reduction that is desired through that clutch.

Movement is transmitted from the input shaft 10 through the adapter 62 to the mounting hub 72, or alternatively, through the mounting hub 72 to the adapter 62 to the output shaft 12. Torque transmission is accomplished through a clutch spring 82 extending around the outer diameter of the mounting hub 72 and the diameter 68 of the adapter 62. The spring 82 is coiled about both the mounting hub and the adapter and has one end terminating with an outwardly projecting release toe 84. Mounted around the outer periphery of the clutch spring 82 is a control sleeve 86 having a ratchet toothed outer periphery, as seen in FIG. 2, adapted to be engaged by the pawl 84. The control or release sleeve 86 has axial grooves on the inner periphery to engage the release toe 84 of the clutch spring. The pawls 48 of the solenoid control assemblies cooperate with the ratchet surface of the release sleeves 86 to control the operation of the clutch mechanism. A number of the coils of the clutch spring 82 are wrapped around the diameter 68 of the adapter 62 and a number of the coils are wrapped around a corresponding diameter 88 of the mounting hub 72. The coils of the spring have their normal inner diameters smaller than the external diameters 68 and 88 so that they are elastically or resiliently preloaded in relation to the adapter and the mounting hub. With the pawl 48 out of engagement with the release sleeve 86, the clutch spring 82 and the clutch mechanism is in a torque transmitting attitude. That is, the preloading of the spring coils about the adapter diameter 68 causes the coils to be in frictional engagement with the surface of the adapter and hub and to transmit torque from the adapter 62 to the hub 86 to produce rotation of gear 80. When the solenoids are deactivated, the spring 56 draws the pawl 48 into engagement with the ratchet surface of the release sleeve 86. The release toe 84, which extends into an axial groove in the release sleeve, is restricted in its rotary movement by the release sleeve and causes the coils of the spring 82 to unwind against the movement of the shaft or mounting hub to extend their inner diameter to a size greater than the diameter 68 of the adapter 62, thus releasing the hub 62 for independent movement and placing the entire clutch in an idle or non-torque transmitting attitude. Conversely, when a solenoid is actuated and the pawl 48 is withdrawn from the ratchet surface of the sleeve 86, the spring 82 is allowed to contract again about the adapter 62 and transmit torque through to the hub 72.

Each of the input gears 66 on an adapter 62 on the input shaft 10 meshes with a corresponding gear 80 on a hub 72. Also, each of the gears 80 on the hub 72 on the input shaft 10 mesh with a gear 66 on an adapter on the output shaft 12. Since the two gears 66 on the input shaft rotate continuously with the input shaft, they continually rotate the floating gears 80 on the output shaft 12. Therefore, to transmit power to the output shaft 12, it is only necessary to actuate one of the two clutch mechanisms mounted on the shaft 12; likewise, since the floating gears 80 on the mounting hub 72 on the input shaft 10 are in engagement with the gears 66 which are secured to the output shaft 12 through the adapter 62, it is possible to transmit power from the input shaft to the output shaft through these two gear trains by actuating one of the clutch mechanisms on the input shaft, thus, there are four possible gearing arrangements which give the speed desired by merely selecting a particular clutch mechanism for transmitting power at various speeds from shaft 10 to shaft 12. It should be noted that this embodiment shows four such speed ratios; however, it is possible, merely by extending the input and output shafts and including additional pairs of clutch mechanisms on each shaft, to extend the number of speed ratios available, as desired.

The gears used are helical gears so that the desired ratio between input and output speeds may be accomplished on parallel shafts. If conventional spur gears were used and the distance between shafts was established for one speed ratio, then other speed ratios would require gears with a number of teeth that is not a whole number. That is, for a given distance between gear centers and a given ratio between gears, the number of teeth in each gear would be the factor to be determined and, in most cases, would require a number of teeth plus a fraction of a tooth. In order to change the gear-speed ratio without changing the center distance, helical gears may be used and the helix angle changed to satisfy the given requirements. The helix angle can be determined by equating the cosine of the helix angle to the ratio of the distance between shaft centers for a whole number of spur gear teeth that gives the desired gear-speed ratio to the actual distance between shaft centers. In this manner, the desired speed ratios are obtained on parallel shafts merely by changing the helix angle on each set of gears.

While the present invention, as to its objects and advantages, as described herein, has been carried out in specific embodiments thereof, it is not desired to be limited thereby but it is intended to cover the invention broadly within the spirit and scope of the appended claims.

What is claimed is:

1. A power transmisison of the type wherein a series of preselected speeds may be obtained from a constant input speed through a series of constantly meshed gears including an input shaft and an output shaft arranged in parallel,
a predetermined number of overrunning clutches arranged on the input shaft and on the output shaft,
each clutch containing a first hub member attached to its respective shaft for rotation therewith and a second hub member mounted for free rotation about its respective shaft,
a gear mounted on and secured to each hub of each clutch,
the arrangement of the clutches on the shafts being such that the gears on the first hubs on the input shaft engage the gears on the second hubs on the output shaft and the gears on the second hubs on the input shaft engage the gears on the first hubs on the output shaft,
and a control mechanism for each clutch to effect a power transmitting relationship between the first hubs and the second hubs whereby power may be transmitted from the input shaft to the output shaft through any one of the clutches.

2. A variable speed transmission capable of transmitting power directly from a power input shaft to a power shaft including:

a transmission housing,
a power input shaft and a power output shaft rotatably journaled in parallel relationship in the transmission housing,
a series of power transmitting gear sets equal in number to the number of output speed ratios desired,
each power transmitting gear set including: a first gear mounted on and secured to either shaft, a second gear mounted on and freely rotatable about the other shaft in a position to mesh with the first gear and an overriding clutch associated with the second gear to engage and disengage the second gear from driving relationship with the associated shaft,
and means to actuate selectively the clutch associated with each set of power transmitting gears to provide a power transmiting relationship between the input shaft and the output shaft.

3. The apparatus of claim 2 wherein the gears are helical gears with the helix angle in each gear set varied to provide different speed relationships between the input and output shafts.

References Cited by the Examiner
UNITED STATES PATENTS 2,234,179   3/1941   Knox _____ 74—359
2,819,624   1/1958   Brown et al. _____ 74—368

DON A. WAITE, *Primary Examiner.*